(12) United States Patent
Liang et al.

(10) Patent No.: US 12,467,853 B2
(45) Date of Patent: Nov. 11, 2025

(54) ON-LINE MULTI-COMPONENT GAS ANALYSIS SYSTEM BASED ON SPECTRAL ABSORPTION TECHNOLOGY AND ANALYSIS METHOD THEREOF

(71) Applicants: CCTEG SHENYANG RESEARCH INSTITUTE, Shenyang (CN); CHINA COAL RESEARCH INSTITUTE, Beijing (CN)

(72) Inventors: Yuntao Liang, Shenyang (CN); Fuchao Tian, Shenyang (CN); Shuanglin Song, Shenyang (CN); Xiangning Meng, Shenyang (CN); Yong Sun, Shenyang (CN); Rui Zhou, Shenyang (CN); Jincheng Wang, Shenyang (CN); Zhongyu Zheng, Shenyang (CN)

(73) Assignees: CCTEG SHENYANG RESEARCH INSTITUTE, Shenyang (CN); CHINA COAL RESEARCH INSTITUTE, Beijing (CN)

( * ) Notice: Subject to any disclaimer, the term of this patent is extended or adjusted under 35 U.S.C. 154(b) by 191 days.

(21) Appl. No.: 18/544,818

(22) Filed: Dec. 19, 2023

(65) Prior Publication Data
US 2024/0133804 A1    Apr. 25, 2024

Related U.S. Application Data

(63) Continuation of application No. PCT/CN2022/137985, filed on Dec. 9, 2022.

(30) Foreign Application Priority Data

Sep. 1, 2022  (CN) .......................... 202211065660.9

(51) Int. Cl.
*G01N 21/31* (2006.01)
*G01N 1/24* (2006.01)
*G01N 1/34* (2006.01)

(52) U.S. Cl.
CPC ............... *G01N 21/31* (2013.01); *G01N 1/24* (2013.01); *G01N 1/34* (2013.01)

(58) Field of Classification Search
CPC .... G01N 1/24; G01N 1/34; G01N 2021/3129; G01N 2021/8578; G01N 21/31;
(Continued)

(56) References Cited

U.S. PATENT DOCUMENTS

2020/0003680 A1* 1/2020 Le .......................... G01N 21/51

FOREIGN PATENT DOCUMENTS

| CN | 101788546 B | * | 11/2012 | |
| CN | 108150221 A | | 6/2018 | |
| CN | 110907397 A | * | 3/2020 | ........... G01N 1/2205 |

OTHER PUBLICATIONS

Chaiyboun et al. ("Modular Analytical Multicomponent Analysis in Gas Sensor Arrays", Sensors 2006, 6, 270-283) (Year: 2006).*
(Continued)

*Primary Examiner* — Hina F Ayub
(74) *Attorney, Agent, or Firm* — HAUPTMAN HAM, LLP (57) ABSTRACT

An on-line multi-component gas analysis system based on a spectral absorption technology includes a housing, wherein the housing includes an air inlet hole and an air outlet hole which are respectively connected with an air inlet pipe and an air outlet pipe, and the housing includes a dust removal and dehumidification device, a micro vacuum pump, an electronic flowmeter, and a plurality of different gas sensors; the dust removal and dehumidification device, which is configured to perform dust removal and dehumidification
(Continued)

treatment on a gas entering from the air inlet hole; the micro vacuum pump, one end of which being connected with the dust removal and dehumidification device through a pipeline, and the other end of which being connected with the electronic flowmeter; and the plurality of different gas sensors. The disclosure includes an analysis method based on the on-line multi-component gas analysis system based on a spectral absorption technology.

5 Claims, 7 Drawing Sheets

(58) Field of Classification Search
CPC ......... G01N 21/85; G01N 2201/12707; G01N 2201/12715; Y02A 50/20
See application file for complete search history.

(56) References Cited

OTHER PUBLICATIONS

International Search Report and Written Opinion issued in International Application No. PCT/CN2022/137985; mailed May 26, 2023; 11 pages.
First Search Report issued in Chinese Application No. 202211065660.9; mailed Apr. 21, 2023; 5 pages.

* cited by examiner

ON-LINE MULTI-COMPONENT GAS ANALYSIS SYSTEM BASED ON SPECTRAL ABSORPTION TECHNOLOGY AND ANALYSIS METHOD THEREOF

RELATED APPLICATIONS

The present application is a Continuation of International Application Number PCT/CN2022/137985 filed Dec. 9, 2022, which claims priority to Chinese Application Number 202211065660.9 filed Sep. 1, 2022, the disclosure of which is hereby incorporated by reference herein in its entirety.

TECHNICAL FIELD

The present invention relates to the technical field of gas detection, and in particular to an on-line multi-component gas analysis system based on a spectral absorption technology and an analysis method thereof.

BACKGROUND

As various gases are widely used in life or industry, gas analyzers play an important role in a variety of scenarios as measurement tools for gases. For example, the composition and concentration of a disaster gas in an industrial environment are major precursor information for characterizing the risk of occurrence of disasters, and if the content of a disaster gas in an industrial environment is excessive, it will lead to casualties and economic losses. Therefore, it is necessary to monitor the composition and concentrations of a plurality of gases in an industrial environment in real time to avoid occurrence of accidents.

In the prior art, the detection of gases in the industrial environment has the following defects:
(1) current industrial environment single-component or multi-component gas analyzers in common use are limited by the method itself or the field conditions, and the specific gas analysis speed is slow and the system error is large, so they can not meet the in-situ online monitoring of dangerous industrial environment gases, and the quantitative analysis effect is not good, so that users cannot comprehensively understand the gas composition situation of the current environment, and thus cannot operate with the detection result.
(2) current industrial environmental gas analyzers in common use lack processing methods for gas monitoring data, when the gas analyzer is in an emergency environment, such as a flammable industrial environment or an explosive industrial environment, rapid danger identification is required for monitoring data, and therefore, it is urgently required to improve accuracy and time efficiency of an industrial environmental gas monitoring data early warning method, so as to quantitatively analyze the concentration of a multi-component gas, accurately determine the occurrence and development state of industrial environmental gas danger, and provide data support for emergency rescue and accident treatment.

SUMMARY

The present invention provides an on-line multi-component gas analysis system based on a spectral absorption technology and an analysis method thereof.

The first aspect of the present invention proposes an on-line multi-component gas analysis system based on a spectral absorption technology, including a housing, wherein the housing is provided with an air inlet hole and an air outlet hole which are respectively connected with an air inlet pipe and an air outlet pipe, and the housing is further provided with a dust removal and dehumidification device, a micro vacuum pump, an electronic flowmeter, and a plurality of different gas sensors;

the dust removal and dehumidification device, which is connected with the air inlet hole through a pipeline for performing dust removal and dehumidification treatment on a gas entering from the air inlet hole;

the micro vacuum pump, one end of which being connected with the dust removal and dehumidification device through a pipeline, and the other end of which being connected with the electronic flowmeter, and the electronic flowmeter being configured to control and acquire the flow rate of the input gas; and the plurality of different gas sensors, which are connected in series through a pipeline, a beginning side of the series connection of the plurality of different gas sensors is connected with the electronic flowmeter for detecting the gas concentration in the gas passing through the electronic flowmeter, a tail side of the series connection of the plurality of different gas sensors is connected to the air outlet hole through a pipeline for discharging the gas passing through the plurality of different gas sensors in sequence through the air outlet hole.

Further, the plurality of different gas sensors include an oxygen sensor, a methane sensor, a carbon monoxide sensor, a carbon dioxide sensor, a hydrogen sulfide sensor, a sulfur dioxide sensor, a nitrogen dioxide sensor and an ammonia sensor.

Further, the on-line multi-component gas analysis system based on the spectral absorption technology further includes a main board, and a central processing module, a data storage module, a data analysis module and a communication module are provided on the main board;

the central processing module includes a signal converter and a processor; the signal converter is respectively connected with the micro vacuum pump, the electronic flowmeter, and the plurality of different gas sensors for receiving electrical signals transmitted by the micro vacuum pump, the electronic flowmeter, and the plurality of different gas sensors, and converting the received electrical signals into digital signals; the processor is connected with the signal converter for receiving the digital signals transmitted by the signal converter, and processing the data signals;

the data storage module is connected with the processor for receiving data sent by the processor, and storing the received data;

the data analysis module is connected with the data storage module for acquiring data transmitted by the plurality of different gas sensors in the data storage module, and performing analysis on the data; and the communication module is configured to perform data transmission with an outbound device.

Further, an analysis method of the data analysis module includes the following steps:

Step a, generating local feature level data with an SVM algorithm;

taking the concentration data of the plurality of different kinds of gases at each time in the data analysis module as an eigenvector of a data sample, then inputting a typical non-linear eigenvalue vector into a data fusion processing center, utilizing a non-linear mapping function of a support vector machine to perform fusion recognition on various symptom information obtained by a network, and generate the local feature level data;

Step b, constructing an evidence set of a multi-component gas overrun value according to a data fusion D-S evidence body fusion method, including the following steps:

Step b1, according to the number of times that a multi-component gas overrun occurs of the local feature level data, establishing an identification architecture of a multi-component gas overrun D-S evidence theory as:

$$\Theta = \{F_A F_B\} \quad (1)$$

wherein:

$\Theta$ represents an identification set of the multi-component gas overrun D-S evidence theory;

$F_A$ represents the number of times that a multi-component gas overrun occurs; and $F_B$ represents the number of times that a multi-component gas overrun does not occur;

the multi-component gas overrun is specifically: a concentration of one or more gases measured in a specific test environment detected by the methane sensor, the carbon monoxide sensor, the carbon dioxide sensor, the hydrogen sulfide sensor, the sulfur dioxide sensor, the nitrogen dioxide sensor, and the ammonia sensor exceeds a threshold value;

Step b2, taking the established support vector machine local feature level data as an input of a D-S multi-source information dissolution evidence body, calculating an overrun uncertainty probability, which is implemented as follows:

$$m(\theta) = E_n \quad (2)$$

$$E_n = \sqrt{\sum_{i=1}^{N} (p(F_i) - y(E_i))^2} \quad (3)$$

wherein in the formula (2) and formula (3):

$m(\theta)$ represents an overrun uncertainty probability;

$(F_i)$ represents an actual output of the SVM;

$y(E_i)$ represents a desired output;

$E_n$ represents an overrun SVM output error; and

N represents the number of support vectors;

Step b3, in the multi-component gas overrun data fusion identification process, determining that the multi-component gas overrun data has no intersection, wherein, when $m_i(C) = \{m_1, m_2, \ldots, m_n\}$, there is an evidence body composed of n transfer functions, which is synthesized according to the following formula:

$$m(C) = \frac{\sum_{\cap F_j = C} \prod_{i=1}^{n} m_i(F_j)}{1 - \sum_{\cap F_j = \varphi} \prod_{i=1}^{n} m_i(F_j)} \quad (4)$$

in the formula (4):

m(C) represents a source information fusion evidence body synthesized by n transfer functions;

$F_j$ represents the number of times that the multi-component gas overrun occurs, j=1, 2, . . . , t, is the number of overrun gas types; and φ represents an intersection of multi-component gas overrun ratios; and Step c, determining whether the multi-component gas is overrun according to a decision rule for the multi-component gas overrun early warning identification:

wherein, the decision rule for the multi-component gas overrun early warning m(θ)<0.01 m(C)>0.5; and when the above decision rule is satisfied, considering that the gas concentration of the currently detected environment is excessive, and performing early warning.

Further, the on-line multi-component gas analysis system based on the spectral absorption technology further includes a touch-control display screen, the touch-control display screen is disposed on the housing, the touch-control display screen is connected with the main board for displaying an analysis result of the data analysis module, and for receiving an input instruction.

Further, the bottom of the housing is provided with a plurality of rollers to facilitate the movement of the housing.

A first aspect of the present invention proposes an analysis method based on an on-line multi-component gas analysis system based on a spectral absorption technology, including the following steps:

Step 1, checking the state of the on-line multi-component gas analysis system based on a spectral absorption technology, starting up and pre-heating for 10 min;

Step 2, calibrating each gas sensor before testing: after the air inlet hole is vented with $N_2$ at a concentration of 99.999%, the gas flow rate is controlled at 500 mL/min, venting is performed for 5 min, and an output number of the sensor is stable, clicking zero calibration and a calibrated span on a touch-control display screen; and Step 3, starting testing: transporting the on-line multi-component gas analysis system based on a spectral absorption technology into an environment to be tested, activating a micro vacuum pump, making a gas pass through a dust removal and dehumidification device for filtering out dust or moisture from the environment, then sequentially through an oxygen sensor, a methane sensor, a carbon monoxide sensor, a carbon dioxide sensor, a hydrogen sulfide sensor, a sulfur dioxide sensor, a nitrogen dioxide sensor, and an ammonia sensor for monitoring the gas concentration and obtaining multi-component gas concentration data, converting an electrical signal of the gas concentration data of each sensor into a digital signal via a signal converter, processing the digital signals to form data via a processor, and sending the data to a data storage module for storage, and obtaining the concentration data of the various kinds of gases at each time in the data storage module for analysis by a data analysis module to obtain an early warning analysis result, and sending the result to the touch-control display screen for displaying and prompting operation.

Further, the analysis method of the data analysis module includes the following steps:

Step a, generating local feature level data with an SVM algorithm;

taking the concentration data of the plurality of different kinds of gases at each time in the data analysis module as an eigenvector of a data sample, then inputting a typical non-linear eigenvalue vector into a data fusion processing center, utilizing a non-linear mapping function of a support vector machine to perform fusion recognition on various symptom information obtained by a network, and generate the local feature level data;

Step b, constructing an evidence set of a multi-component gas overrun value according to a data fusion D-S evidence body fusion method, including the following steps:

Step b1, according to the number of times that a multi-component gas overrun occurs of the local feature level data, establishing an identification architecture of a multi-component gas overrun D-S evidence theory as:

$$\Theta = \{F_A F_B\} \quad (1)$$

wherein:

$\Theta$ represents an identification set of the multi-component gas overrun D-S evidence theory;

$F_A$ represents the number of times that a multi-component gas overrun occurs; and $F_B$ represents the number of times that a multi-component gas overrun does not occur;

the multi-component gas overrun is specifically: a concentration of one or more gases measured in a specific test environment detected by the methane sensor, the carbon monoxide sensor, the carbon dioxide sensor, the hydrogen sulfide sensor, the sulfur dioxide sensor, the nitrogen dioxide sensor, and the ammonia sensor exceeds a threshold value;

Step b2, taking the established support vector machine local feature level data as an input of a D-S multi-source information dissolution evidence body, calculating an overrun uncertainty probability, which is implemented as follows:

$$m(\theta) = E_n \quad (2)$$

$$E_n = \sqrt{\sum_{i=1}^{N}(p(F_i) - y(E_i))^2} \quad (3)$$

wherein in the formula (2) and formula (3):

$m(\theta)$ represents an overrun uncertainty probability;

$(F_i)$ represents an actual output of the SVM;

$y(E_i)$ represents a desired output;

$E_n$ represents an overrun SVM output error; and

N represents the number of support vectors;

Step b3, in the multi-component gas overrun data fusion identification process, determining that the multi-component gas overrun data has no intersection, wherein, when $m_i(C)=\{m_1, m_2, \ldots, m_n\}$, there is an evidence body composed of n transfer functions, which is synthesized according to the following formula:

$$m(C) = \frac{\sum_{\cap F_j = C} \prod_{i=1}^{n} m_i(F_j)}{1 - \sum_{\cap F_j = \varphi} \prod_{i=1}^{n} m_i(F_j)} \quad (4)$$

in the formula (4):

$m(C)$ represents a source information fusion evidence body synthesized by n transfer functions;

$F_j$ represents the number of times that the multi-component gas overrun occurs, j=1, 2, . . . , t, t is the number of overrun gas types; and $\varphi$ represents an intersection of multi-component gas overrun ratios; and Step c, determining whether the multi-component gas is overrun according to a decision rule for the multi-component gas overrun early warning identification:

wherein, the decision rule for the multi-component gas overrun early warning identification is: $m(\theta)<0.01$ and $m(C)>0.5$; and when the above decision rule is satisfied, considering that the gas concentration of the currently detected environment is excessive, and performing early warning.

Further, the early warning analysis result in step 3 is additionally transmitted to an outbound device through a communication module, and the early warning analysis result is obtained by the outbound device and the online analysis system is controlled, and the remote control of the online analysis system by a user is achieved.

In the on-line multi-component gas analysis system based on a spectral absorption technology proposed by the present invention, the concentrations of trace gases and constant gases in the gases in the current environment can be detected by a plurality of different gas sensors, thereby making the measured gas types more abundant and further making the detection results obtained based on the concentrations of various gases more comprehensive.

After adopting the above solution, the beneficial effects of the present invention are as follows:

(1) the invention realizes real-time monitoring and on-line analysis of eight kinds of gases including trace gases (ammonia, sulfur dioxide, nitrogen dioxide, hydrogen sulfide, carbon monoxide) and constant gases (methane, carbon dioxide, oxygen) in the industrial environment, and basically meets the requirements of on-line monitoring of multi-component gases in a flammable industrial environment or explosive industrial environment.

(2) the invention combines the SVM algorithm, the feature level data layer and the D-S evidence body fusion method to construct the evidence set of the multi-component gas overrun value, and introduces the source information fusion evidence body synthesized by the transfer function, which can realize the uncertainty probability and early warning quantitative analysis result of the multi-component gas overrun in the industrial environment.

(3) combined with the multi-component gas on-line analysis system and the analysis method of the invention, the real-time performance and accuracy of industrial environmental gas monitoring are effectively improved, the occurrence and development state of industrial environmental gas danger can be accurately judged, and data support is provided for emergency rescue and accident treatment.

BRIEF DESCRIPTION OF THE DRAWINGS

The above and/or additional aspects and advantages of the invention will become apparent and readily appreciated from the following description of embodiments, taken in conjunction with the accompanying drawings, in which.

In the drawings: 1—housing, 2—dust removal and dehumidification device, 3—micro vacuum pump, 4—electronic flowmeter, 5—oxygen sensor, 6—methane sensor, 7—carbon monoxide sensor, 8—carbon dioxide sensor, 9—hydrogen sulfide sensor, 10—sulfur dioxide sensor, 11—nitrogen dioxide sensor, 12—ammonia sensor, 13—air inlet hole, 14—air outlet hole, 15—touch-control display screen, 16—roller, 17—main board, 18—central processing module, 181—signal converter, 182—processor, 19—data storage module, 20—data analysis module, 21—communication module, 22—outbound device.

DETAILED DESCRIPTION

Reference will now be made in detail to embodiments of the present invention, examples of which are illustrated in the accompanying drawings, wherein the same or similar reference numerals refer to the same or similar elements or elements having the same or similar function throughout. The embodiments described below by referring to the accompanying drawings are exemplary, intended to be used for explaining the present invention, and are not to be understood as limiting the present invention.

Embodiment One

Referring to FIGS. 1-6, the on-line multi-component gas analysis system based on a spectral absorption technology includes a housing 1, wherein the housing 1 is provided with an air inlet hole 13 and an air outlet hole 14 which are respectively connected with an air inlet pipe and an air outlet pipe, and the housing 1 is further provided with a dust removal and dehumidification device 2, a micro vacuum pump 3, an electronic flowmeter 4, and a plurality of different gas sensors;

the dust removal and dehumidification device 2, which is connected with the air inlet hole 13 through a pipeline for performing dust removal and dehumidification treatment on a gas entering from the air inlet hole 13;

the micro vacuum pump 3, one end of which being connected with the dust removal and dehumidification device 2 through a pipeline, and the other end of which being connected with the electronic flowmeter 4, and the electronic flowmeter 4 being configured to control and acquire the flow rate of the input gas; and the plurality of different gas sensors, which are connected in series through a pipeline, a beginning side of the series connection of the plurality of different gas sensors is connected with the electronic flowmeter 4 for detecting the gas concentration in the gas passing through the electronic flowmeter 4, a tail side of the series connection of the plurality of different gas sensors is connected to the air outlet hole 14 through a pipeline for discharging the gas passing through the plurality of different gas sensors in sequence through the air outlet hole 14.

The plurality of different gas sensors includes an oxygen sensor 5, a methane sensor 6, a carbon monoxide sensor 7, a carbon dioxide sensor 8, a hydrogen sulfide sensor 9, a sulfur dioxide sensor 10, a nitrogen dioxide sensor 11, and an ammonia sensor 12. The plurality of different gas sensors are configured to measure the gas concentrations of $O_2$ (oxygen), $CH_4$ (methane), CO (carbon monoxide), $CO_2$ (carbon dioxide), $H_2S$ (hydrogen sulfide), $SO_2$ (sulfur dioxide), $NO_2$ (nitrogen dioxide) and $NH_3$ (ammonia). Among them, $H_2S$ (hydrogen sulfide), $NO_2$ (nitrogen dioxide), $SO_2$ (sulfur dioxide) and $NH_3$ (ammonia) are trace gases, and CO (carbon monoxide), $CO_2$ (carbon dioxide), $CH_4$ (methane) and $O_2$ (oxygen) are constant gases.

The on-line multi-component gas analysis system based on the spectral absorption technology further includes a main board 17, which is mounted inside the housing 1 by means of a mounting board and on the left side of the carbon dioxide sensor 8 (as shown in FIGS. 2-5), the main board 17 is provided with a central processing module 18, a data storage module 19, a data analysis module 20 and a communication module 21.

Figure 1:
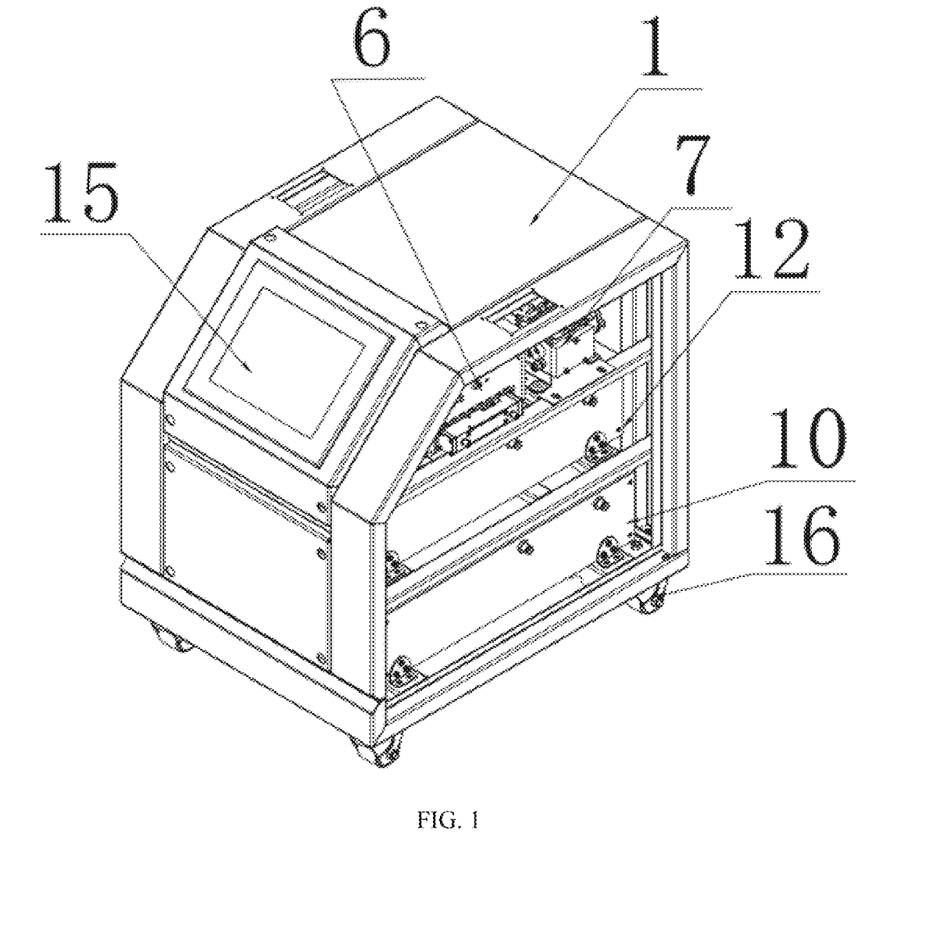
FIG. 1 is a schematic diagram of an internal structure of an on-line multi-component gas analysis system based on a spectral absorption technology according to the present invention.
Figure 2:
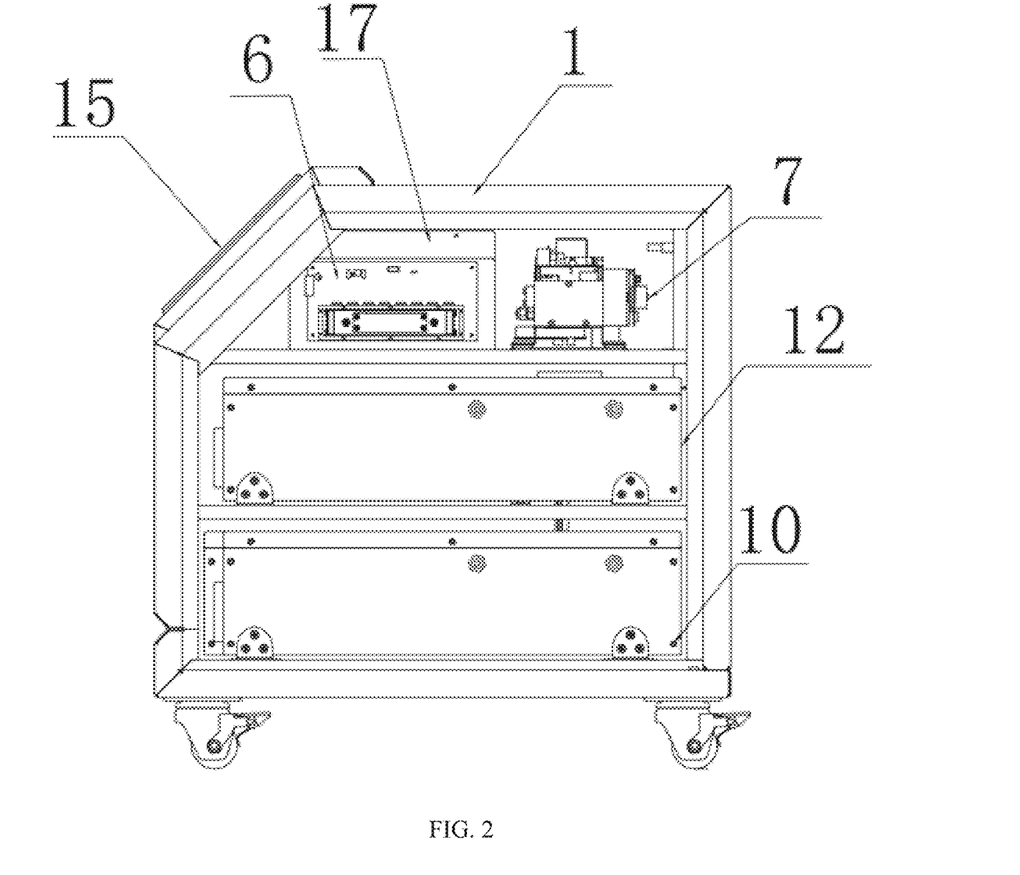
FIG. 2 is a right side view of FIG. 1.
Figure 3:
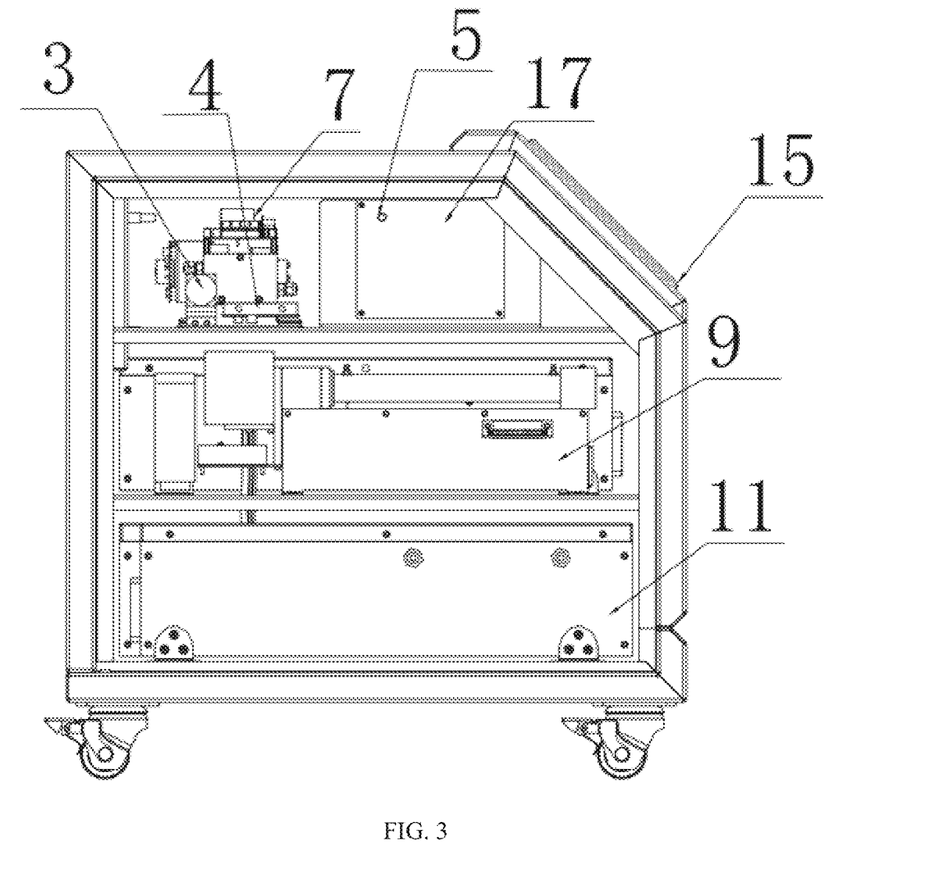
FIG. 3 is a left side view of FIG. 1.
Figure 4:
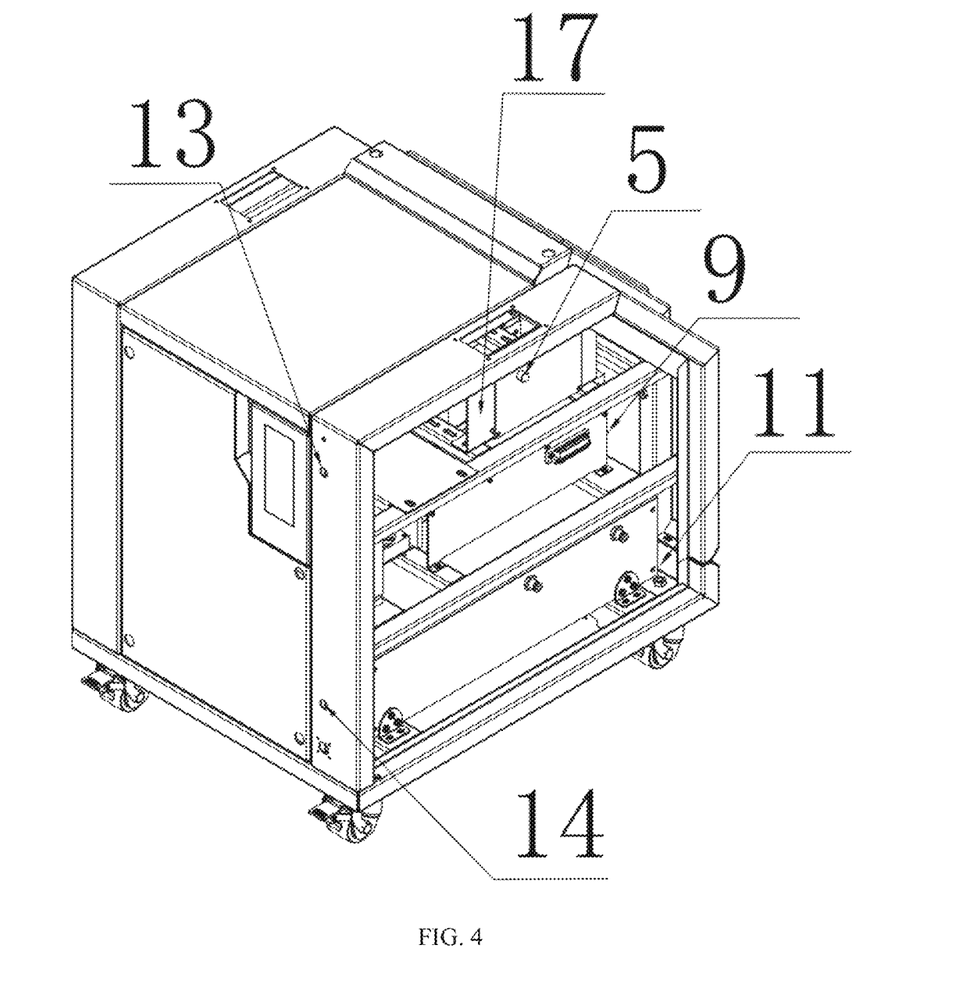
FIG. 4 is a rear-side structural schematic diagram of the on-line multi-component gas analysis system based on a spectral absorption technology according to the present invention.
Figure 5:
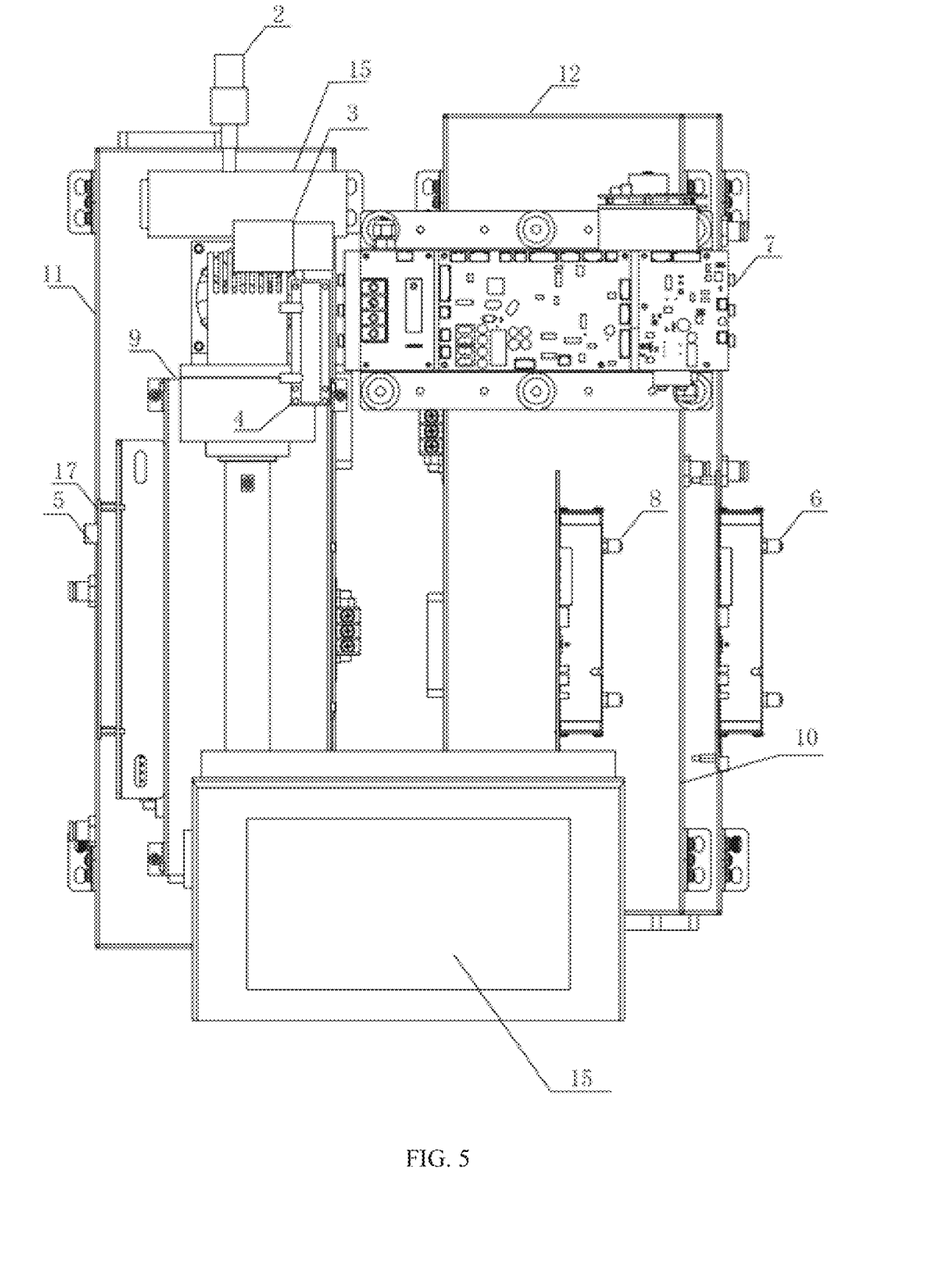
FIG. 5 is a schematic diagram of a mounting position of the internal structure of the on-line multi-component gas analysis system based on a spectral absorption technology according to the present invention after a housing is removed.

In the present invention, the inside of the housing 1 is a cavity, the inside is a three-layer frame structure, the micro vacuum pump 3, the electronic flowmeter 4, the methane sensor 6, the carbon monoxide sensor 7, the main board 17, the oxygen sensor 5 are arranged on a first layer frame, the hydrogen sulfide sensor 9, the ammonia sensor 12 are arranged on a second layer frame, the sulfur dioxide sensor 10, the nitrogen dioxide sensor 11 are arranged on a third layer frame. The structural arrangement is reasonable, space-saving, and installation is convenient.

Figure 7:
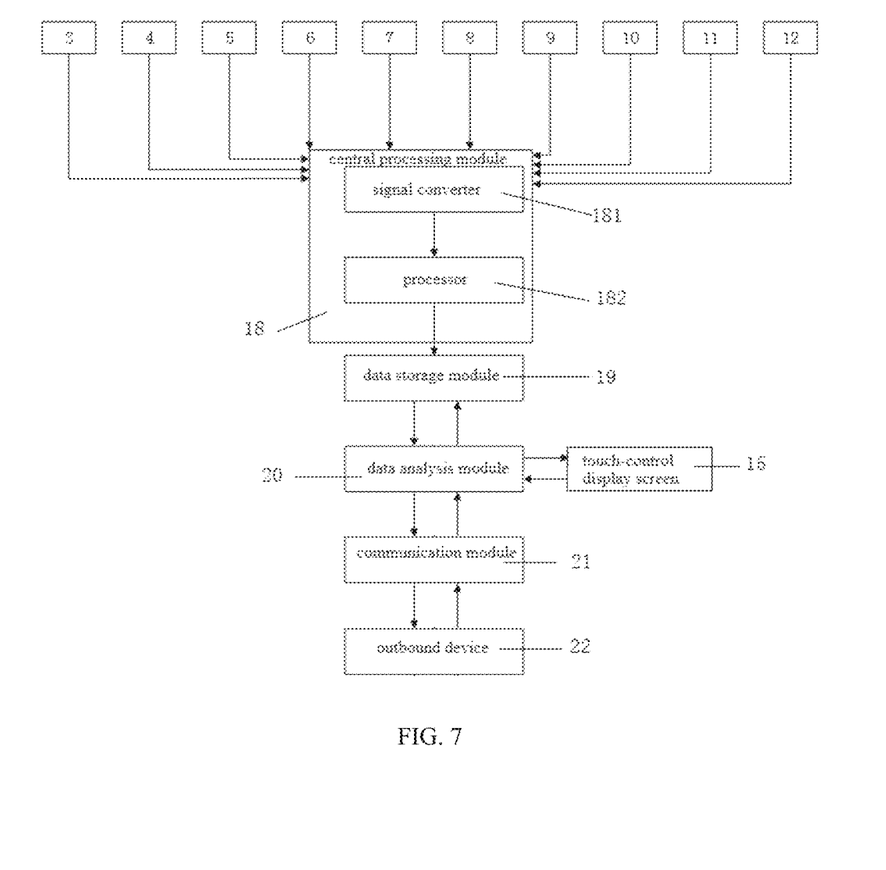
FIG. 7 is a system block diagram of the on-line multi-component gas analysis system based on a spectral absorption technology according to the present invention.

Referring to FIG. 7, the central processing module 18 includes a signal converter 181 and a processor 182; the signal converter 181 is connected to the micro vacuum pump 3, the electronic flowmeter 4, and the plurality of different gas sensors, respectively, for receiving the electric signals transmitted by the micro vacuum pump 3, the electronic flowmeter 4, the plurality of different gas sensors, and converting the received electric signals into digital signals; the processor 182 is connected with the signal converter 181 for receiving the digital signals transmitted by the signal converter 181 and processing the data signals;

the data storage module 19 is connected with the processor 182 for receiving data sent by the processor 182 and storing the received data;

the data analysis module is connected with the data storage module 19 for acquiring data transmitted by the plurality of different gas sensors in the data storage module 19, and performing analysis on the data; and the communication module 21 is configured to perform data transmission with an outbound device.

The analysis method of the data analysis module includes the following steps:

Step a, local feature level data is generated with a Support Vector Machine (SVM) algorithm;

the concentration data of the plurality of different kinds of gases at each time in the data analysis module is taken as an eigenvector of a data sample, then a typical non-linear eigenvalue vector is input into a data fusion processing center, a non-linear mapping function of a support vector machine is utilized to perform fusion recognition on various symptom information obtained by a network, and the local feature level data is generated;

Step b, an evidence set of a multi-component gas overrun value is constructed according to a data fusion D-S evidence body fusion method, the following steps are included:

Step b1, according to the number of times that a multi-component gas overrun occurs of the local feature level data, an identification architecture of a multi-component gas overrun D-S evidence theory is established as:

$$\Theta = \{F_A F_B\} \quad (1)$$

wherein:

η represents an identification set of the multi-component gas overrun D-S evidence theory;

$F_A$ represents the number of times that a multi-component gas overrun occurs; and $F_B$ represents the number of times that a multi-component gas overrun does not occur;

the multi-component gas overrun is specifically: a concentration of one or more gases measured in a specific test environment detected by the methane sensor 6, the carbon monoxide sensor 7, the carbon dioxide sensor 8, the hydrogen sulfide sensor 9, the sulfur dioxide sensor 10, the nitrogen dioxide sensor 11, and the ammonia sensor 12 exceeds a threshold value;

Step b2, the established support vector machine local feature level data is taken as an input of a D-S multi-source information dissolution evidence body, an overrun uncertainty probability is calculated, which is implemented as follows:

$$m(\theta) = E_n \quad (2)$$

$$E_n = \sqrt{\sum_{i=1}^{N} (p(F_i) - y(E_i))^2} \quad (3)$$

wherein in the formula (2) and formula (3):

(θ) represents an overrun uncertainty probability;

($F_i$) represents an actual output of the SVM;

y($E_i$) represents a desired output;

$E_n$ represents an overrun SVM output error; and

N represents the number of support vectors;

Step b3, in the multi-component gas overrun data fusion identification process, it is determined that the multi-component gas overrun data has no intersection, wherein, when $m_i(C) = \{m_1, m_2, \ldots, m_n\}$, there is an evidence body composed of n transfer functions, which is synthesized according to the following formula:

$$m(C) = \frac{\sum_{\cap F_j = C} \prod_{i=1}^{n} m_i(F_j)}{1 - \sum_{\cap F_j = \varphi} \prod_{i=1}^{n} m_i(F_j)} \quad (4)$$

in the formula (4):

m(C) represents a source information fusion evidence body synthesized by n transfer functions;

$F_j$ represents the number of times that the multi-component gas overrun occurs, j=1, 2, ..., t, t is the number of overrun gas types; and φ represents an intersection of multi-component gas overrun ratios; and Step c, whether the multi-component gas is overrun is determined according to a decision rule for the multi-component gas overrun early warning identification:

wherein, the decision rule for the multi-component gas overrun early warning identification is: m(θ)<0.01 and m(C)>0.5; and when the above decision rule is satisfied, it is considered that the gas concentration of the currently detected environment is excessive, and early warning is performed.

Figure 6:
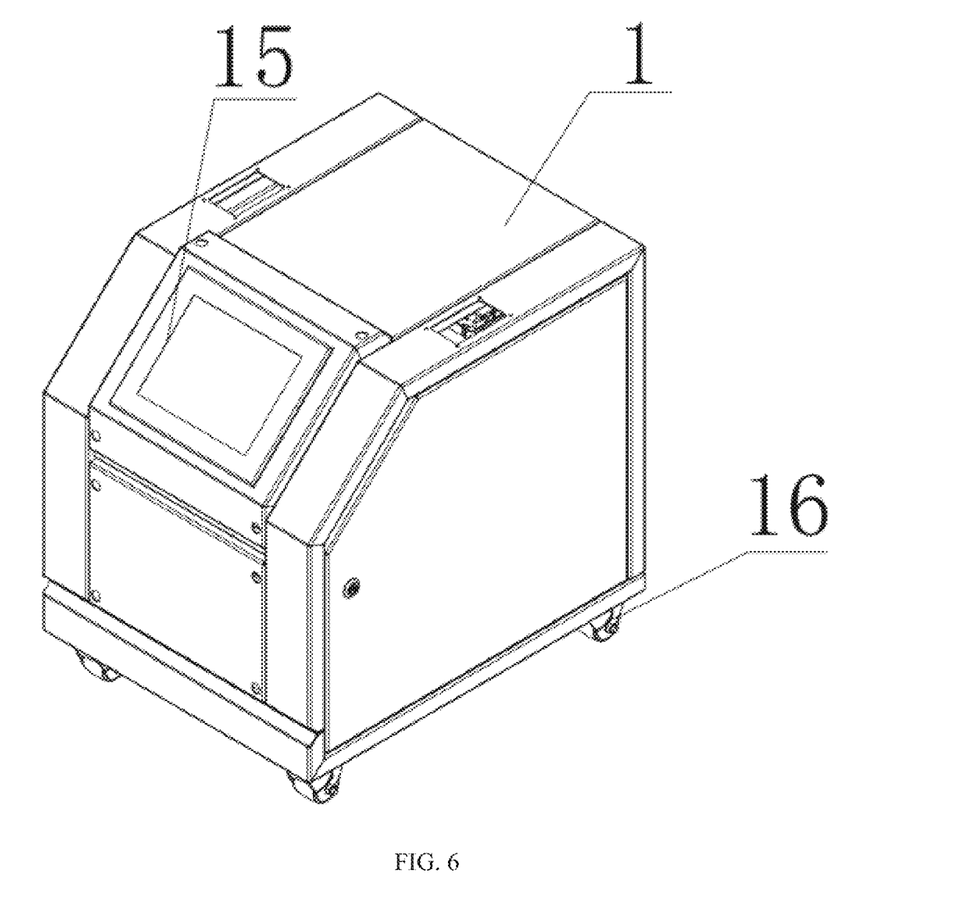
FIG. 6 is a schematic diagram of an external structure of the on-line multi-component gas analysis system based on a spectral absorption technology according to the present invention.

The on-line multi-component gas analysis system based on the spectral absorption technology further includes a touch-control display screen 15, the touch-control display screen 15 is disposed on the housing 1, the touch-control display screen 15 is connected with the main board 17 for displaying an analysis result of the data analysis module, and for receiving an input instruction.

The bottom of the housing 1 is provided with a plurality of rollers 16 to facilitate the movement of the housing 1.

Embodiment Two

The analysis method based on an on-line multi-component gas analysis system based on a spectral absorption technology, being implemented with the on-line multi-component gas analysis system based on the spectral absorption technology described above, includes the following steps:

Step 1, the state of the on-line multi-component gas analysis system based on a spectral absorption technology, is checked, starting-up and pre-heating for 10 min are performed;

Step 2, each gas sensor is calibrated before testing: after the air inlet hole 13 is vented with $N_2$ at a concentration of 99.999%, the gas flow rate is controlled at 500 mL/min, venting is performed for 5 min, and an output number of the sensor is stable, zero calibration and a calibrated span are clicked on a touch-control display screen 15; in order to ensure the accuracy of the gas to be tested in the calibrated span, preferably a 80% full-span standard gas is selected. On the one hand, $N_2$ is vented to clean the residual impurity gas in the pipeline and sensor gas chamber, and on the other hand, zero calibration can be performed on the next sensor to be tested; and Step 3, testing is started: the on-line multi-component gas analysis system based on a spectral absorption technology is transported into an environment to be tested, a micro vacuum pump 3 is activated, a gas passes through a dust removal and dehumidification device 21 for filtering out dust or moisture from the environment, then sequentially through an oxygen sensor 5, a methane sensor 6, a carbon monoxide sensor 7, a carbon dioxide sensor 8, a hydrogen sulfide sensor 9, a sulfur dioxide sensor 10, a nitrogen dioxide sensor 11, and an ammonia sensor 12 for monitoring the gas concentration and obtaining multi-component gas concentration data, an electrical signal of the gas concentration data of each sensor is converted into a digital signal via a signal converter, 181, the digital signals are processed to form data via a processor 182, and the data is sent to a data storage module 19 for storage, and the concentration data of the various kinds of gases at each time in the data storage module 19 is obtained for analysis by a data analysis module 20 to obtain an early warning analysis result, and the result is sent to the touch-control display screen 15 for displaying and prompting operation.

The analysis method of the data analysis module includes the following steps:

Step a, local feature level data is generated with a Support Vector Machine (SVM) algorithm;

the concentration data of the plurality of different kinds of gases at each time in the data analysis module is taken as an eigenvector of a data sample, then a typical non-linear eigenvalue vector is input into a data fusion processing center, a non-linear mapping function of a support vector machine is utilized to perform fusion recognition on various symptom information obtained by a network, and the local feature level data is generated;

Step b, an evidence set of a multi-component gas overrun value is constructed according to a data fusion D-S evidence body fusion method, the following steps are included:

Step b1, according to the number of times that a multi-component gas overrun occurs of the local feature level data, an identification architecture of a multi-component gas overrun D-S evidence theory is established as:

$$\Theta = \{F_A F_B\} \quad (1)$$

wherein:

$\Theta$ represents an identification set of the multi-component gas overrun D-S evidence theory;

$F_A$ represents the number of times that a multi-component gas overrun occurs; and $F_B$ represents the number of times that a multi-component gas overrun does not occur;

the multi-component gas overrun is specifically: a concentration of one or more gases measured in a specific test environment detected by the methane sensor 6, the carbon monoxide sensor 7, the carbon dioxide sensor 8, the hydrogen sulfide sensor 9, the sulfur dioxide sensor 10, the nitrogen dioxide sensor 11, and the ammonia sensor 12 exceeds a threshold value;

Step b2, the established support vector machine local feature level data is taken as an input of a D-S multi-source information dissolution evidence body, an overrun uncertainty probability is calculated, which is implemented as follows:

$$m(\theta) = E_n \quad (2)$$

$$E_n = \sqrt{\sum_{i=1}^{N}(p(F_i) - y(E_i))^2} \quad (3)$$

wherein in the formula (2) and formula (3):

$m(\theta)$ represents an overrun uncertainty probability;

$(F_i)$ represents an actual output of the SVM;

$y(E_i)$ represents a desired output;

$E_n$ represents an overrun SVM output error; and

N represents the number of support vectors;

Step b3, in the multi-component gas overrun data fusion identification process, it is determined that the multi-component gas overrun data has no intersection, wherein, when $m_i(C) = \{m_1, m_2, \ldots, m_n\}$, there is an evidence body composed of n transfer functions, which is synthesized according to the following formula:

$$m(C) = \frac{\sum_{\cap F_j = C} \prod_{i=1}^{n} m_i(F_j)}{1 - \sum_{\cap F_j = \varphi} \prod_{i=1}^{n} m_i(F_j)} \quad (4)$$

in the formula (4):

m(C) represents a source information fusion evidence body synthesized by n transfer functions;

$F_j$ represents the number of times that the multi-component gas overrun occurs, j=1, 2, . . . , t, t is the number of overrun gas types; and $\varphi$ represents an intersection of multi-component gas overrun ratios; and Step c, whether the multi-component gas is overrun is determined according to a decision rule for the multi-component gas overrun early warning identification:

wherein, the decision rule for the multi-component gas overrun early warning identification is: $m(\theta) < 0.01$ and $m(C) > 0.5$; and when the above decision rule is satisfied, it is considered that the gas concentration of the currently detected environment is excessive, and early warning is performed.

In Embodiment One and Embodiment Two of the present invention, when the the on-line multi-component gas analysis system described above is placed in an industrial environment, the gas is sucked in through the air inlet hole 13 and the dust removal and dehumidification device 2 by the micro vacuum pump 3 in a manner of suction, the flow rate of the input gas is then acquired through the electronic flowmeter 4 connected with the micro vacuum pump 3, the gas passing through the electronic flowmeter 4 passes sequentially through the oxygen sensor 5, the methane sensor 6, the carbon monoxide sensor 7, the carbon dioxide sensor 8, the hydrogen sulfide sensor 9, the sulfur dioxide sensor 10, the nitrogen dioxide sensor 11, and the ammonia sensor 12, each gas sensor collects the concentration of the corresponding gas and does not operate on the gas itself and then the gas is vented through the air outlet hole 14.

In Embodiment One and Embodiment Two of the present invention, the above on-line multi-component gas analysis system may collect the concentrations of the corresponding gases in the input gas through the oxygen sensor 5, the methane sensor 6, the carbon monoxide sensor 7, the carbon dioxide sensor 8, the hydrogen sulfide sensor 9, the sulfur dioxide sensor 10, the nitrogen dioxide sensor 11, the ammonia sensor 12 which are connected in series, so that the measured gas types are more abundant and the detection results based on the concentrations of various gases are more comprehensive.

In Embodiment One and Embodiment Two of the present invention, the on-line gas analysis system in the atmosphere can directly analyze one or more types of the concentration data of the plurality of different gases to obtain the current air quality.

In Embodiment One and Embodiment Two of the present invention, the concentration data of different gases at each time can be used by the data analysis module 20 to analyze a plurality of different gases in the current environment to obtain an early warning analysis result, thereby making it possible for the user to better understand the degree of danger of the current environment.

In Embodiment One and Embodiment Two of the present invention, the data analysis module 20 periodically updates the analysis result, and sends the updated analysis result to the touch-control display screen 15 for display, so that the user can clearly know the concentrations of various gases in the current environment. Also, in the embodiment of the present invention, the touch-control display screen 15 is a mine intrinsically safe explosion-proof screen, which can be applied to various hazardous environments (e.g., industrial hazardous environments, which can still be used). The touch-control display screen 15 is also configured to receive input instructions and transmit the input instructions to the data analysis module 20. Specifically, in Embodiment One and Embodiment Two of the present invention, the touch-control display screen 15 may directly receive instructions (e.g., setting the flow rate of the gas in the electronic flowmeter) input by the user and transmit the received instructions to the data analysis module 20 connected with the touch-control display screen 15.

In Embodiment One and Embodiment Two of the present invention, the outbound device 22 may include one or more of a computer, a tablet, a mobile phone, and an industrial personal computer. Further, in an embodiment of the invention, the analysis results can be directly transmitted to the outbound device 22 through the communication module 21, and in particular, the communication module 21 can employ WIFI so that the user can remotely understand the gas analysis results of the current environment, and the user can also control the online analysis system through the outbound device 22, thus enabling remote control of the online analysis system by the user.

Based on the above description, the proposed on-line multi-component gas analysis system based on a spectral absorption technology can be applied in a specific scenario, when a leak occurs in a certain industrial environment, a user can remotely control the online analysis system to move into this industrial environment through the outbound device 22 so as to analyze the gas of the current industrial environment to obtain an analysis result, and according to the analysis result, prompt the user is reminded of the gas composition and the content of various gases in the current industrial environment, and at the same time, the danger level and the precautions of the current industrial environment are given, so that the user can fully understand the industrial environment using the online analysis system, and then respond accordingly, thus avoiding unnecessary casualties or losses caused by the user responding without knowing the specific situation of the industrial environment.

In the description of this specification, descriptions of the reference terms "one embodiment," "some embodiments," "example," "specific example," or "some examples," etc. mean that specific features, structures, materials, or features described in connection with the embodiment or example are included in at least one embodiment or example of the invention. In this specification, the schematic formulation of the above terms need not be directed to the same embodiments or examples. Further, the specific features, structures, materials, or features described may be combined in a suitable manner in any one or more embodiments or examples. Further, without contradicting one another, those skilled in the art may combine different embodiments or examples described in this specification and features of different embodiments or examples.

Any process or method description in the flowchart or otherwise described herein may be understood as representing a module, fragment, or portion of code including one or more executable instructions for implementing steps of a customized logical function or process, and the scope of the preferred embodiments of the invention encompasses further implementations in which functions may be performed in a substantially simultaneous manner or in a reverse order in accordance with the functions involved, not in the order shown or discussed, which will be understood by those skilled in the art to which embodiments of the invention belong.

Although the embodiments of the present invention have been shown and described above, it will be appreciated that the above embodiments are illustrative and not to be construed as limiting the present invention, and those of ordinary skill in the art may make changes, modifications, substitutions, and variations to the above embodiments within the scope of the present invention.

The invention claimed is:

1. An on-line multi-component gas analysis system based on a spectral absorption technology, characterized by comprising a housing, wherein the housing is provided with an air inlet hole and an air outlet hole which are respectively connected with an air inlet pipe and an air outlet pipe, and the housing is further provided with a dust removal and dehumidification device, a micro vacuum pump, an electronic flowmeter, and a plurality of different gas sensors;

the dust removal and dehumidification device, which is connected with the air inlet hole through a pipeline for performing dust removal and dehumidification treatment on a gas entering from the air inlet hole;

the micro vacuum pump, one end of which being connected with the dust removal and dehumidification device through a pipeline, and the other end of which being connected with the electronic flowmeter, and the electronic flowmeter being configured to control and acquire the flow rate of the input gas; and the plurality of different gas sensors, which are connected in series through a pipeline, a beginning side of the series connection of the plurality of different gas sensors is connected with the electronic flowmeter for detecting the gas concentration in the gas passing through the electronic flowmeter, a tail side of the series connection of the plurality of different gas sensors is connected to the air outlet hole through a pipeline for discharging the gas passing through the plurality of different gas sensors in sequence through the air outlet hole;

the plurality of different gas sensors comprise an oxygen sensor, a methane sensor, a carbon monoxide sensor, a carbon dioxide sensor, a hydrogen sulfide sensor, a sulfur dioxide sensor, a nitrogen dioxide sensor and an ammonia sensor;

the on-line multi-component gas analysis system based on the spectral absorption technology further comprises a main board, and a central processing module, a data storage module, a data analysis module and a communication module are provided on the main board;

the central processing module comprises a signal converter and a processor; the signal converter is respectively connected with the micro vacuum pump, the electronic flowmeter, and the plurality of different gas sensors for receiving electrical signals transmitted by the micro vacuum pump, the electronic flowmeter, and the plurality of different gas sensors, and converting the received electrical signals into digital signals; the processor is connected with the signal converter for receiving the digital signals transmitted by the signal converter, and processing the data signals;

the data storage module is connected with the processor for receiving data sent by the processor, and storing the received data;

the data analysis module is connected with the data storage module for acquiring data transmitted by the plurality of different gas sensors in the data storage module, and performing analysis on the data; and the communication module is configured to perform data transmission with an outbound device;

an analysis method of the data analysis module comprises the following steps:

Step a, generating local feature level data with an SVM algorithm;

taking the concentration data of the plurality of different kinds of gases at each time in the data analysis module as an eigenvector of a data sample, then inputting a typical non-linear eigenvalue vector into a data fusion processing center, utilizing a non-linear mapping function of a support vector machine to perform fusion recognition on various symptom information obtained by a network, and generate the local feature level data;

Step b, constructing an evidence set of a multi-component gas overrun value according to a data fusion D-S evidence body fusion method, comprising the following steps:

Step b1, according to the number of times that a multi-component gas overrun occurs of the local feature level data, establishing an identification architecture of a multi-component gas overrun D-S evidence theory as:

$$\Theta = \{F_A F_B\} \quad (1)$$

wherein:

$\Theta$ represents an identification set of the multi-component gas overrun D-S evidence theory;

$F_A$ represents the number of times that a multi-component gas overrun occurs; and $F_B$ represents the number of times that a multi-component gas overrun does not occur;

the multi-component gas overrun is specifically: a concentration of one or more gases measured in a specific test environment detected by the methane sensor, the carbon monoxide sensor, the carbon dioxide sensor, the hydrogen sulfide sensor, the sulfur dioxide sensor, the nitrogen dioxide sensor, and the ammonia sensor exceeds a threshold value;

Step b2, taking the established support vector machine local feature level data as an input of a D-S multi-source information dissolution evidence body, calculating an overrun uncertainty probability, which is implemented as follows:

$$m(\theta) = E_n \quad (2)$$

$$E_n = \sqrt{\sum_{i=1}^{N}(p(F_i) - y(E_i))^2} \quad (3)$$

wherein in the formula (2) and formula (3):

$m(\theta)$ represents an overrun uncertainty probability;

$p(F_i)$ represents an actual output of the SVM;

$y(E_i)$ represents a desired output;

$E_n$ represents an overrun SVM output error; and

N represents the number of support vectors;

Step b3, in the multi-component gas overrun data fusion identification process, determining that the multi-component gas overrun data has no intersection, wherein, when $m_i(C)=\{m_1, m_2, \ldots, m_n\}$, there is an evidence body composed of n transfer functions, which is synthesized according to the following formula:

$$m(C) = \frac{\sum_{\cap F_j = C} \prod_{i=1}^{n} m_i(F_j)}{1 - \sum_{\cap F_j = \varphi} \prod_{i=1}^{n} m_i(F_j)} \quad (4)$$

in the formula (4):

m(C) represents a source information fusion evidence body synthesized by n transfer functions;

$F_j$ represents the number of times that the multi-component gas overrun occurs, j=1, 2, ..., t, t is the number of overrun gas types; and $\varphi$ represents an intersection of multi-component gas overrun ratios; and Step c, determining whether the multi-component gas is overrun according to a decision rule for the multi-component gas overrun early warning identification:

wherein, the decision rule for the multi-component gas overrun early warning identification is: $m(\theta)<0.01$ and $m(C)>0.5$; and when the above decision rule is satisfied, considering that the gas concentration of the currently detected environment is excessive, and performing early warning.

2. The on-line multi-component gas analysis system based on a spectral absorption technology according to claim 1, characterized in that, the on-line multi-component gas analysis system based on the spectral absorption technology further comprises a touch-control display screen, the touch-control display screen is disposed on the housing, the touch-control display screen is connected with the main board for displaying an analysis result of the data analysis module, and for receiving an input instruction.

3. The on-line multi-component gas analysis system based on a spectral absorption technology according to claim 1, characterized in that the bottom of the housing is provided with a plurality of rollers to facilitate the movement of the housing.

4. An analysis method based on an on-line multi-component gas analysis system based on a spectral absorption technology, being implemented with the on-line multi-component gas analysis system based on the spectral absorption technology according to claim 1, comprising the following steps:

Step 1, checking the state of the on-line multi-component gas analysis system based on a spectral absorption technology, starting up and pre-heating for 10 min;

Step 2, calibrating each gas sensor before testing: after the air inlet hole is vented with $N_2$ at a concentration of 99.999%, the gas flow rate is controlled at 500 mL/min, venting is performed for 5 min, and an output number of the sensor is stable, clicking zero calibration and a calibrated span on a touch-control display screen; and Step 3, starting testing: transporting the on-line multi-component gas analysis system based on a spectral absorption technology into an environment to be tested, activating a micro vacuum pump, making a gas pass through a dust removal and dehumidification device for filtering out dust or moisture from the environment, then sequentially through an oxygen sensor, a methane sensor, a carbon monoxide sensor, a carbon dioxide sensor, a hydrogen sulfide sensor, a sulfur dioxide sensor, a nitrogen dioxide sensor, and an ammonia sensor for monitoring the gas concentration and obtaining multi-component gas concentration data, converting an electrical signal of the gas concentration data of each sensor into a digital signal via a signal converter, processing the digital signals to form data via a processor, and sending the data to a data storage module for storage, and obtaining the concentration data of the various kinds of gases at each time in the data storage module for analysis by a data analysis module to obtain an early warning analysis result, and sending the result to the touch-control display screen for displaying and prompting operation.

5. The analysis method based on the on-line multi-component gas analysis system based on a spectral absorption technology according to claim 4, characterized in that the early warning analysis result in step 3 is additionally transmitted to an outbound device through a communication module, and the early warning analysis result is obtained by the outbound device and the online analysis system is controlled, and the remote control of the online analysis system by a user is achieved.

\* \* \* \* \*